United States Patent [11] 3,526,228

[72] Inventor Ralph S. Lyng
 Martinsville, New Jersey
[21] Appl. No. 810,919
[22] Filed March 24, 1969
 Continuation of Ser. No. 408,663
 Nov. 3, 1964
[45] Patented Sept. 1, 1970
[73] Assignee Ethicon, Inc.
 a corporation of New Jersey

[54] COLLAGEN LAMINA DURAL PROSTHESIS
 3 Claims, No Drawings

[52] U.S. Cl. ..................................................... 128/334,
 161/94, 117/141, 117/164
[51] Int. Cl. ....................................................... A61b 17/04,
 17/04, A61l 17/00
[50] Field of Search .......................................... 128/334,
 335, 335.5, (Collagen Digest); 117/81, 83, 141, 142, 164;
 161/92, 94

[56] References Cited
UNITED STATES PATENTS
2,039,262 4/1936 Schulte ........................ 128/335.5
3,223,551 12/1965 Tu ................................. 117/141X
3,272,204 9/1966 Artandi et al. ................ 128/334
3,366,440 1/1968 Nuwayser ...................... 8/115.6
3,400,719 9/1968 Eckhart ......................... 128/334

FOREIGN PATENTS
851,720 10/1960 Great Britain ................. 128/334

OTHER REFERENCES
The Lancet, October 1965, pp. 711–12.
Song et al.: "Surg. Forum," vol 14, October 1963, pp. 466-468.

*Primary Examiner*—Dalton L. Truluck
*Attorney*—Alexander T. Kardos, John Beriont and Robert W. Kell ABSTRACT: A tanned collagen fabric is impregnated with collagen fibrils to form a collagen-film laminate that finds use as a surgical prosthesis.

COLLAGEN LAMINA DURAL PROSTHESIS

This application is a continuation of application 408,663, filed November 3, 1964 now abandoned.

The present invention relates to a collagen fabric-collagen film laminate that is useful in surgery and to a method of manufacturing such a product.

During the past two decades striking advances have been made in reparative surgery. This program has resulted primarily from the development of suitable materials for bridging defects and surgical techniques for their successful utilization.

Prostheses have been used for many years in hernia operations to reinforce the abdominal walls. More recently fabric prostheses of Dacron and Teflon have been utilized in the surgical repair of defects in the chest and the peritoneum. Such fabric prostheses that have been rendered bloodtight by the presence of body-absorbable collagen fibrils in the interstices of the fabric are described and claimed in copending application Ser. No. 92,620, filed March 1, 1961 now abandoned.

Inert fabric prostheses have the disadvantage, however, that they are not absorbed but remain in the body for the life of the patient. The ideal prosthesis should retain its strength in intimate contact with body fluids until the healing process is completed and then be absorbed and replaced by new tissue that is formed in situ by the patient.

The present invention has for its principal object the provision of flexible laminated sheets and films which are compatable with the human body and constructed entirely of collagen.

Another object of this invention is the manufacture of collagen prosthesis that will be entirely absorbed by the human body.

It has now been discovered that an improved prosthesis can be constructed using as a framework or support a collagen fabric woven, knitted, crocheted or braided of collagen strands. The collagen strands may be tanned either prior to manufacture of the fabric or subsequent thereto. In the prosthesis of the present invention the interstices between the collagen strands are filled and rendered bloodtight by tanned collagen fibrils, which form a sheet of film that is laminated to at least one surface of the fabric.

It is an advantage of the prosthetic material of the present invention that it has a high tensile strength and is somewhat elastic when wet. The fabric layer of the laminate contributes good suture holding properties and the collagen fibril layer of the laminate provides a semi-permeable microbial barrier that is non-adhesiogenic. The prosthesis of the present invention is slowly absorbed with concomitant replacement by autologous fibrous tissue.

The collagen strands of which the fabric portion of the fabric-film laminate is constructed may be prepared by the method described in U.S. Pat. No. 3,114,593. Alternatively, the fabric may be woven of a collagen multifilament prepared as described in copending application Ser. No. 216.247, filed August 10, 1962, now abandoned. That application teaches that the adhesive bonds that normally form between the individual monofilaments can be disrupted and the multifilaments recovered in essentially the same form in which it leaves the spinnerette surface by isolating a section of the dried bundle of adhered monofilaments between two points and mechanically imparting thereto a variable tension in a direction parallel to the longitudinal axis of the bundle. Since it is important to prevent breaking any of the collagen monofilaments the applied tension must at no time exceed the elastic limit of the monofilaments.

The structure of the prosthesis of the present invention is that of a laminated fabric. As indicated above the fabric may be woven of collagen multifilament or collagen strands. Preferably the collagen fabric is a leno weave as this weave has good suture holding properties combined with high tensile strength.

The fabric is tanned to a degree that is dependent upon the desired absorption characteristics of the prosthesis. Alternatively the collagen multifilament or strands may be tanned prior to forming the fabric. It is preferred, however, that the fabric be tanned after it is woven as the collagen swells slightly in the tanning solution. When the fabric is dried, subsequent to the tanning step the softened warp strands or multifilaments have a tendency to cohere to the softened woof strands or multifilament at the points of contact.

The tanned fabric is laminated to a sheet or film of collagen fibrils, that may be conveniently formed by coating at least one side of the fabric with a swollen mass of collagen fibrils. The collagen fibrils fill the interstices of the fabric and cohere thereto to form a fabric-film laminate. The in vivo absorption characteristics of the collagen film like those of the fabric may be controlled by the degree of tanning and the collagen fibrils that make up the film may be tanned before or after application to the fabric.

The process for the manufacture of the fabric-film laminate of the present invention and the nature of the product obtained, may be more fully understood from the following detailed description and examples which are explanatory but do not restrict the invention. Throughout the examples that follow all quantities are expressed in parts by weight unless otherwise indicated.

EXAMPLE I

Chrome, Pyrogallol, Formaldehyde Tanned Fabric-Formaldehyde Tanned Film

Untanned collagen strands are prepared by the general procedure described in Examples I and II of U.S. Pat. No. 3,114,593. The spinnerette employed had 69 orifices and resulted in a size 4/0 collagen strand (8.2 mils in diameter). The alum-formaldehyde tanning solution employed at the godet 102 is replaced with water and an untanned collagen strand is collected on the take-up spool. The loosely adhered multifilament strand so obtained is mechanically flexed under tension in a direction parallel to the longitudinal axis of the strand to separate the cohered monofilaments and produce a multifilament made of 69 individual collagen monofilaments.

This untanned collagen multifilament is woven into a leno fabric as follows:

A warp is prepared from 160 ends of 440 denier collagen multifilament having 2½ twists per inch. The reed has two ends per dent in alternate dents of a 20 reed, set 8" wide in the reed. The fabric is woven with 22 picks per inch of 440 denier untwisted collagen multifilament. The loom on which this fabric is woven is equipped with a leno attachment. This results in a fabric, the warp threads of which are twisted collagen multifilament (440 denier, 2½ twists per inch) and the filling threads of which are untwisted 440 denier collagen multifilaments. The thread count of this fabric is 20 threads per inch but a more open fabric having a thread count of 16 or even 10 is suitable for preparing the fabric-film laminate of the present invention.

A piece of this leno fabric 72" long and 7" wide is tanned for five minutes in a solution containing 1 percent formaldehyde and chromium sulfate at a concentration equivalent to 0.4 percent $Cr_2O_3$, pH 3.9. The fabric is removed from this solution and allowed to dry in air for an additional five minutes after which it is given three one-minute washes in distilled water. The fabric is then treated for five minutes in a solution containing 0.5 percent pyrogallol and 0.6 percent sodium hydrosulfite. It is removed from this solution, allowed to dry for five minutes in air, and washed three times for one minute in distilled water. The tanned fabric is then permitted to dry while stretched on a frame to a dimension of 60—65" in length and 6" in width.

Twelve hundred parts of a collagen dispersion prepared according to Example I of U.S. Pat. No. 3,114,593, and containing approximately 1 percent collagen is pretanned with formaldehyde by adding 2 parts of 1 percent aqueous formaldehyde per 100 parts of dispersion and mixing in a Waring blender for about fifteen seconds. A glass plate is coated with a release agent (Rulon, a Teflon aerosol preparation). A piece of the tanned collagen fabric 28" long and 7" wide is placed on the plate and a small quantity of the pretanned dispersion, previously deaerated in vacuum, is worked into the fabric, levelled to a depth of ⅛" and permitted to dry. This results in a film approximately 1 mil thick laminated to the fabric.

The film is washed in water to remove excess acid, and air-dried.

EXAMPLE II

Transparent Siliconized Fabric-Film Laminate

This material is prepared as described in Example I except that the fabric is washed first in carbon tetrachloride for 5 minutes. The fabric is then removed from the solution and allowed to dry in air for 5 minutes. A glass plate is coated with a silicone release agent (SF96—1000, manufactured by The General Electric Company). The washed fabric, prior to lamination, is wetted for 5 minutes in a collagen dispersion diluted tenfold with distilled water. About 600 ml. of the pretanned and deaerated collagen dispersion is placed on the siliconized glass plate. The wet fabric is layered on top of the dispersion and allowed to soak in it for 5 minutes. The remainder of the dispersion is then applied over the fabric. This results in a fabric-film laminate, one surface of which is a replica of the glass plate on which it is formed.

This prosthesis has found successful experimental application as a partial replacement for the dura in neurosurgery.

EXAMPLE III

Chrome, Pyrogallol, Formaldehyde Tanned Fabric-Chrome, Pyrogallol, Formaldehyde Tanned Film A collagen fabric laminate is prepared as described above except that the collagen dispersion is pretanned with 2 parts of 1 percent formaldehyde per 100 parts of dispersion and 2 parts of 0.5 percent pyrogallol per 100 parts of dispersion. After the dispersion has dried, the laminate is treated for 30 minutes with chromium sulfate at a concentration equivalent to 0.4 percent $Cr_2O_3$ after which it is washed with five gallons of distilled water.

EXAMPLE IV

Formaldehyde Tanned Fabric-Formaldehyde Tanned Film

This material is prepared as described in Example I except that the fabric is tanned for 5 minutes in a solution containing 1 percent formaldehyde, at pH 4.0. The fabric is removed from the solution, allowed to dry in air for 5 minutes, and is washed three times for one minute in distilled water. The fabric treated by this method is not as readily stretched as that containing the chromium salt and is dried while stretched on a frame 55—60" long and 5" wide.

EXAMPLE V

Siliconized Collagen Fabric-Film Laminate

A piece of collagen fabric-film laminate prepared by any of the examples given above is washed three times in acetone and permitted to dry. Silastic Medical Adhesive (silicone Type A), is spread on the surface of the laminate with a spatula and permitted to cure at room temperature overnight. The curing process is carried out in a suitable chamber so that no dust can contaminate the surface. The amount of silicone used was such that 0.33 g. of polymer per square inch of laminate was deposited. The thickness of this layer may be varied according to the properties desired.

While the invention has been described in detail according to the preferred manner of carrying out the process and yielding the products, it will be obvious to those skilled in the art, after understanding the invention, that changes and modifications may be made therein without departing from the spirit or scope of the invention and it is intended in the appended claims to cover such changes and modifications.

I claim:

1. An absorbable surgical prosthesis comprising a tanned collagen fabric manufactured of material selected from the group consisting of extended strands and multifilaments of collagen fibrils, said fabric being coated on at least one side and impregnated with tanned collagen fibrils to form a collagen fabric-film laminate.

2. An absorbable surgical prosthesis comprising a tanned collagen fabric manufactured of material selected from the group consisting of extruded strands and multifilament of collagen fibrils, said fabric being coated on at least one side with tanned collagen fibrils that fill the interstices of the fabric.

3. A surgical prosthesis comprising a tanned collagen fabric manufactured of material selected from the group consisting of extruded strands and multifilaments of collagen fibrils, said fabric being coated on at least one side and impregnated with tanned collagen fibrils to form a collagen fabric-film laminate, and said collagen fabric-film laminate being coated on one side with a film of polymerized silicone resin.

UNITED STATES PATENT OFFICE
CERTIFICATE OF CORRECTION

Patent No. 3,526,228                                September 1, 1970

Ralph S. Lyng

It is certified that error appears in the above identified patent and that said Letters Patent are hereby corrected as shown below:

Column 4, line 31, beginning with "1. An absorbable" cancel all to and including "silicone resin." in line 48, same column 4 and insert the following:

1. An absorbable, semi-permeable dural prosthesis comprising a tanned collagen fabric manufactured of material selected from the group consisting of extruded strands and multifilaments of collagen fibrils, said fabric being coated on at least one side with tanned collagen fibrils that fill the interstices of the fabric and cohere thereto to form a strong and flexible collagen fabric-film laminate characterized by a smooth surface.

2. An absorbable, semi-permeable dural prosthesis comprising a tanned leno weave collagen fabric manufactured of extruded strands of collagen fibrils, said fabric being coated on at least one side with tanned collagen fibrils that fill the interstices of the fabric and cohere thereto to form a strong and flexible collagen fabric-film laminate characterized by a smooth surface.

3. An absorbable, semi-permeable dural prosthesis comprising a tanned collagen leno weave fabric manufactured of extruded strands of collagen fibrils, said fabric being coated on at least one side with tanned collagen fibrils that fill the interstices of the fabric and cohere thereto to form a strong and flexible fabric-film laminate characterized by a smooth surface, said collagen fabric-film laminate being coated on at least one side with a film of polymerized silicone resin.

Signed and sealed this 8th day of December 1970.

(SEAL)
Attest:

EDWARD M. FLETCHER, JR.                      WILLIAM E. SCHUYLER, JR.
Attesting Officer                                    Commissioner of Patents